(No Model.)
E. HAWORTH.
MANUFACTURE OF SULPHURIC ACID.
No. 268,793. Patented Dec. 12, 1882.
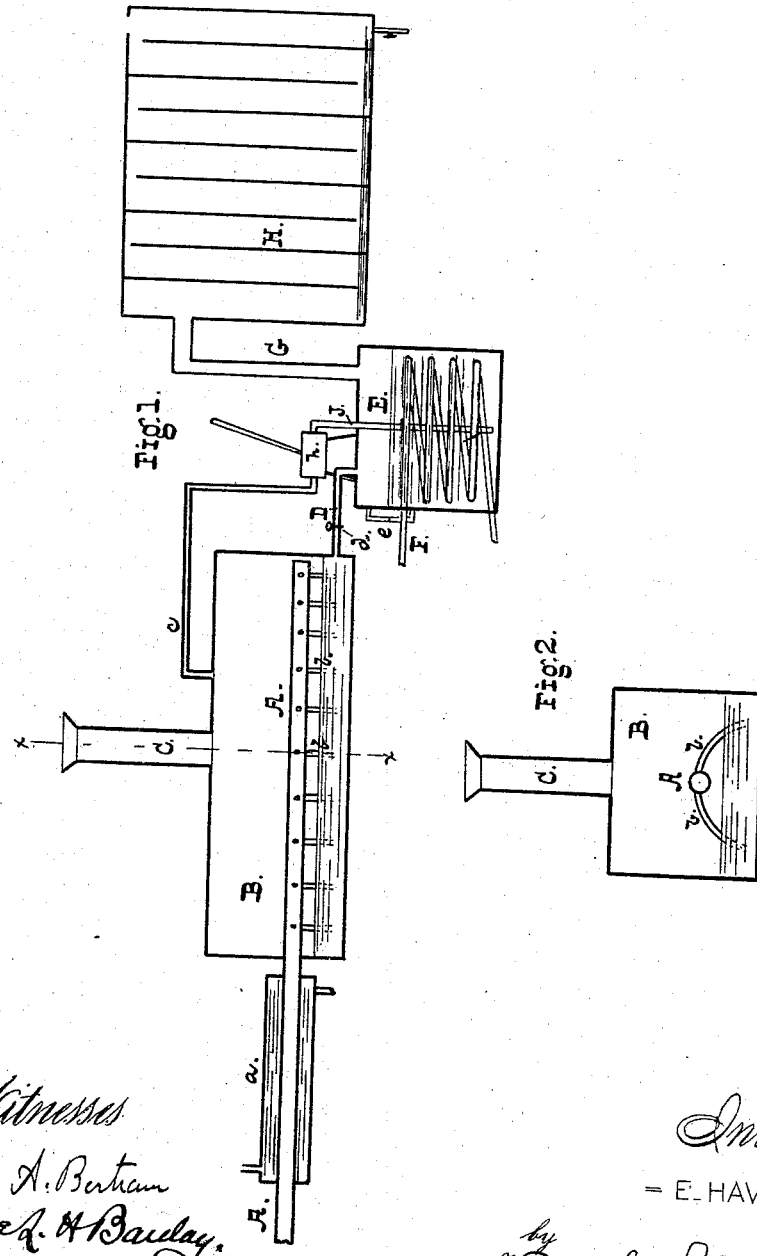
Witnesses
W. A. Bertram
L. H. Barclay
Inventor
= E. HAWORTH =
by
Brashears & Williams
Attorneys

UNITED STATES PATENT OFFICE.

ERASMUS HAWORTH, OF GALENA, KANSAS.

MANUFACTURE OF SULPHURIC ACID.

SPECIFICATION forming part of Letters Patent No. 268,793, dated December 12, 1882.

Application filed August 16, 1882. (No model.)

*To all whom it may concern:*

Be it known that I, ERASMUS HAWORTH, of Galena, Cherokee county, State of Kansas, have invented certain new and useful Improvements in the Manufacture of Sulphuric Acid; and I hereby declare the same to be fully, clearly, and exactly described as follows, reference being had to the accompanying drawings, in which—

Figure 1 is a central vertical sectional view of the device or apparatus used, and Fig. 2 is a transverse section on the line $x\ x$ of Fig. 1.

My invention relates to the manufacture of sulphuric acid by what is known as the "leaden-chamber" process, in which the acid is formed by the reaction of nitric oxide, steam, and oxygen upon sulphurous acid. The latter has heretofore been obtained either by the comparatively costly method of burning sulphur or of burning pyrites. The latter has advantages in point of cheapness, but is attended with drawbacks due to the presence of arsenic, antimony, or other volatile metals in the crude sulphide.

The object of my invention is to adapt to the manufacture of sulphuric acid the waste gases from lead-smelting works, which gases consist principally of sulphurous acid—the product of the reaction of lead sulphide upon sulphate, air, carbonic acid, and carbonic oxide. As the gases come from the furnace they are more or less contaminated with solid matter—such as sulphate of lead, oxide of lead, and carbon—and vapors of any volatile metals, such as arsenic or antimony.

In carrying out my invention the solid matter is removed by conducting the gases through any suitable fume-arrester, by preference such as is shown in my application filed May 26, 1882, and the gases are then led into a pipe, A, which passes through a condenser, $a$, consisting of a chamber or tank, through which a stream of water is led. In winter this tank may be dispensed with, the gases being sufficiently cooled by passing through the exposed pipe. The latter leads into a chamber, B, where it is provided with a number of lateral pipes, $b$, which dip below the surface of water.

C is a stack for the escape of the carbonic oxide, nitrogen, oxygen, and any undissolved carbonic acid. Metallic fumes are condensed in the water and the sulphurous acid is dissolved therein. From time to time a portion of the solution is drawn off through the pipe D by opening the cock $d$ and flows into a tank, E, having a gage-glass, $e$, to show the level of the solution. A steam-coil, F, is led through the tank E, or in lieu of it a furnace may be used to heat the contents.

J is a pipe leading from the bottom of the tank E to a pump, $h$, from which a return-pipe, $c$, leads to the chamber B.

G is a pipe leading from the top of the tank E to the chamber H, which is the usual leaden chamber.

Now, the rationale of my process is substantially as follows: A solution of sulphurous acid is formed in the chamber B, and is led into the tank E, where it is heated, causing an evolution of sulphurous acid gas and vapor of water, the quantity of gas given off being represented by the difference of temperature in the chambers B and E. It is obviously immaterial whether this difference be great or slight so long as the water in the tank E be kept hotter than that in the chamber B, because whatever be the difference the solvent power of the water is greater in the colder chamber and gas is given off in the hotter one. This gas is perfectly pure sulphurous acid, except for the presence of watery vapor, which is necessary anyhow in the chamber H, so that the gas resulting from my process is even better fitted for the manufacture of sulphuric acid than that obtained by burning pure sulphur, as the latter contains an excess of free nitrogen, which is useless in the leaden chamber. Furthermore, I succeed in saving all volatile metals which pass through the fume-arrester. Instead of intermittently withdrawing the solution from the chamber B and intermittently returning it thereto, I may maintain a constant circulation between the chamber and tank E.

I have considered it unnecessary to show in detail the arrangement of the interior of the leaden chamber. Suffice it that it is of the usual or well-known form.

Having thus described my invention, what I claim as new, and desire to secure by Letters Patent, is—

1. The method herein described of manufacturing sulphuric acid, consisting in conducting sulphurous-acid gas, prepared from any suitable source or as a waste or by product of burning pyrites or from lead-works, through water, wherein it is dissolved and any metallic fumes are condensed, then conducting the solution intermittently or by constant flow to a heating-tank and back to the chamber in which the solution is formed, and leading the pure sulphurous-acid gas evolved in the heating-tank to a conventional leaden chamber, substantially as set forth.

2. In combination with the solution-chamber and heating-tank, the inlet and outlet pipes and the leaden chamber H, as set forth.

3. In combination with the pipe A, having lateral branches $b$, the chamber B, exit-pipe D, tank E, return-pipes J $c$, and pump $h$, and the leaden chamber H, as set forth.

ERASMUS HAWORTH.

Witnesses:
 OSCAR T. STREET,
 W. E. HILL.